United States Patent
Tan et al.

(10) Patent No.: US 12,216,693 B2
(45) Date of Patent: Feb. 4, 2025

(54) COMPUTERIZED SYSTEM AND METHOD FOR AUTOMATIC MODERATION OF ONLINE CONTENT

(71) Applicant: VERIZON MEDIA INC., New York, NY (US)

(72) Inventors: Fei Tan, Harrison, NJ (US); Yifan Hu, Mountain Lakes, NJ (US); Kevin Yen, Jersey City, NJ (US); Changwei Hu, New Providence, NJ (US); Ben Shahshahani, Menlo Park, CA (US)

(73) Assignee: YAHOO ASSETS LLC, New York, NY (US)

( * ) Notice: Subject to any disclaimer, the term of this patent is extended or adjusted under 35 U.S.C. 154(b) by 482 days.

(21) Appl. No.: 17/475,710

(22) Filed: Sep. 15, 2021

(65) Prior Publication Data
US 2023/0081879 A1    Mar. 16, 2023

(51) Int. Cl.
*G06F 16/33* (2019.01)
*G06F 16/335* (2019.01)
(Continued)

(52) U.S. Cl.
CPC ........ *G06F 16/3334* (2019.01); *G06F 16/335* (2019.01); *G06F 40/30* (2020.01); *G06N 20/00* (2019.01)

(58) Field of Classification Search
CPC .... G06F 16/3334; G06F 16/33; G06F 16/335; G06F 16/355; G06F 16/35; G06F 16/2228; G06F 16/90332; G06F 16/951; G06F 16/93; G06F 40/30; G06F 40/237; G06F 40/284; G06N 20/00; G06N 20/384;
(Continued)

(56) References Cited

U.S. PATENT DOCUMENTS

2017/0262635 A1* 9/2017 Strauss .............. G06Q 30/0275
2020/0142999 A1* 5/2020 Pedersen ................ G06N 20/00

OTHER PUBLICATIONS

Daniel Berrar, "Bayes' Theorem and Naïve Bayes Classifier", Encyclopedia of Bioinformatics and Computational Biology, vol. 1, Elsevier, pp. 403-412, (Year: 2018).*
(Continued)

*Primary Examiner* — Leshui Zhang
(74) *Attorney, Agent, or Firm* — James J. DeCarlo; Greenberg Traurig, LLP

(57) ABSTRACT

The disclosed systems and methods provide a framework for a proactive prediction of the toxic propensity of an article. Prior to the publication and/or reception of comments to online content, the disclosed framework determines the toxic propensity of the content's context and/or specific words, sentences, sentiments, tone or other messages receivable from consumption of the content. Thus, disclosed framework performs proactive forecasting of the content's toxicity propensity", which quantifies how likely the content is prone to incur or attract toxic comments. The framework can function and/or be configured to operate in a manner that can perform specifically adherent moderation actions that correspond to the content and control how the content can be interacted with, based on the toxic propensity determination, prior to the content's publication in an effort to thwart, prevent or stop toxic environments surrounding or stemming from the content from coming into existence.

20 Claims, 5 Drawing Sheets

(51) Int. Cl.
  *G06F 16/35* (2019.01)
  *G06F 40/30* (2020.01)
  *G06N 20/00* (2019.01)
(58) Field of Classification Search
  CPC ........ G06N 3/006; G06N 3/045; G06Q 10/06;
    G06Q 10/10; G06Q 20/384; G06Q 30/02;
    G06Q 30/0201; G06Q 50/01; G06Q
    50/26; G06Q 40/08; G06Q 40/06
  USPC ................... 704/1–9; 706/12, 13, 15, 16, 20
  See application file for complete search history.

(56) References Cited

OTHER PUBLICATIONS

Silvia L. P. Ferrari, et al."Beta Regression for Modelling Rates and Proportions", J. of Applied Statistics, vol. 31, No. 7, pp. 799-815, Aug. (Year: 2004).*
Sourish Ghosh, et al. "A Study on Support Vector Machine based Linear and Non-Linear Pattern Classification", International Conf. on Intelligent Sustainable Systems, ICISS 2019, IEEE Xplore Part No. CFP19M19-ART, ISBN 978-1-5386-7799-5, pp. 24-28, (Year: 2019).*
Tazimul Hoque, etc. "Analyzing Performance of Different Machine Learning Approaches with Doc2vec for Classifying Sentiment of Bengali Natural Language", 2019 International Conf. on Electrical, Computer and Communication Engineering ECCE, pp. 1-5, Feb. 7-9, (Year: 2019).*
Tan et al., "Bert-B: a Proactive Probabilistic Approach to Text Moderation," 9 pages (2021).
Kingma et al., "Adam: a Method for Stochastic Optimization," ICLR, pp. 1-15 (2015).
Nobata et al., "Abusive Language Detection in Online User Content,", pp. 145-153 (2016).
Tran et al., "Haberator: An Efficient and Effective Deep Hatespeech Detector," Proceedings of the 2020 Conference on Empirical Methods in Natural Language Processing, pp. 7486-7502 (2020).
Wang et al., "Baselines and Bigrams: Simple, Good Sentiment and Topic Classification," Proceedings of the 50th Annual Meeting of the Association for Computational Linguistics, pp. 90-94 (2012).
Devlin et al., "BERT: Pre-training of Deep Bidirectional Transformers for Language Understanding," 16 pages (2019).
Ferrari et al., "Beta Regression for Modelling Rates and Proportions," (2004).
McKinney-Bock et al., "Classification of Semantic Paraphasias: Optimization of a Word Embedding Model," Proceedings of the 3rd Workshop on Evaluating Vector Space Representations for NLP, pp. 52-62 (2019).
Agrawal et al., "Deep Learning for Detecting Cyberbullying Across Multiple Social Media Platforms," Springer Nature, pp. 141-153 (2018).
Badjatiya et al., "Deep Learning for Hate Speech Detection in Tweets," Creative Commons, pp. 759-760 (2017).
Pavlopoulos et al., "Deeper Attention to Abusive User Content Moderation," Proceeding of the 2017 Conference on Empirical Methods in Natural Language Processing, pp. 1125-1135 (2017).
Warner et al., "Detecting Hate Speech on the World Wide Web," Proceedings of the 2012 Workshop on Language in Social Media, pp. 19-26 (2012).
Zhang et al., "Hate Speech Detection Using a Convolution-LSTM Based Deep Neural Network," Nottingham Trent Institutional Repository, 10 pages (2018).
Chen et al., "Detecting Offensive Language in Social Media to Protect Adolescent Online Safety," 10 pages (2012).
Misiek et al., "Development of Multi-level Linguistic Alignment in Child-Adult Conversations," 5 pages (2020).
Simonyan et al., "Deep Inside Convolutional Networks: Visualising Image Classification Models and Saliency Maps," 8 paes (2014).
Aggarwal et al., "Exploration of Gender Differences in COVID-19 Discourse on Reddit," 7 pages (2020).
Blei et al., "Latent Dirichlet Allocation," Journal of Machine Learning Research, 3, pp. 993-1022 (2003).
Shrikumar et al., "Learning Important Features Through Propagating Activation Differences," Proceedings of the 34th International Conference on Machine Learning, 9 pages (2017).
Noever, David, "Machine Learning Suites for Online Toxicity Detection," 9 pages (2018).
Bodapati et al., "Neural Word Decomposition Models for Abusive Language Detection," 11 pages (2019).
Tan et al., "TNT: Text Normalization based Pre-training of Transformers for Content Moderation," Proceedings of the 2020 Conference on Empirical Methods in Natural Language Processing, pp. 4735-4741 (2020).

* cited by examiner

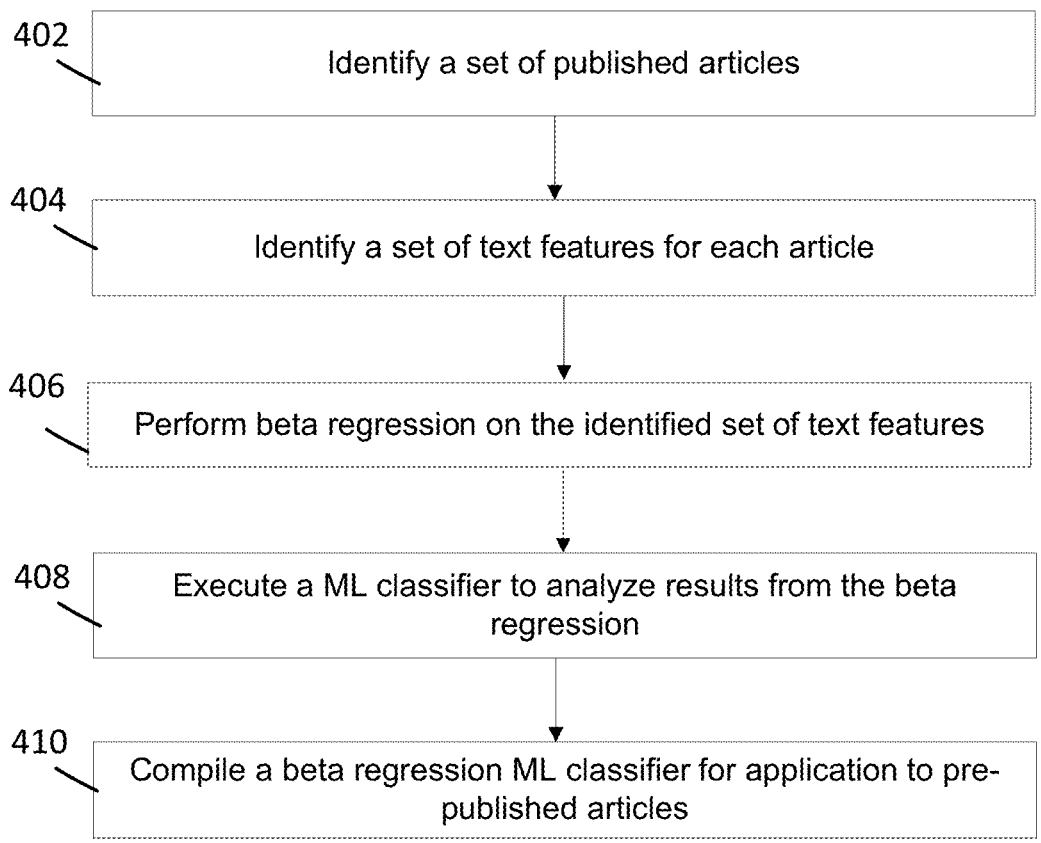

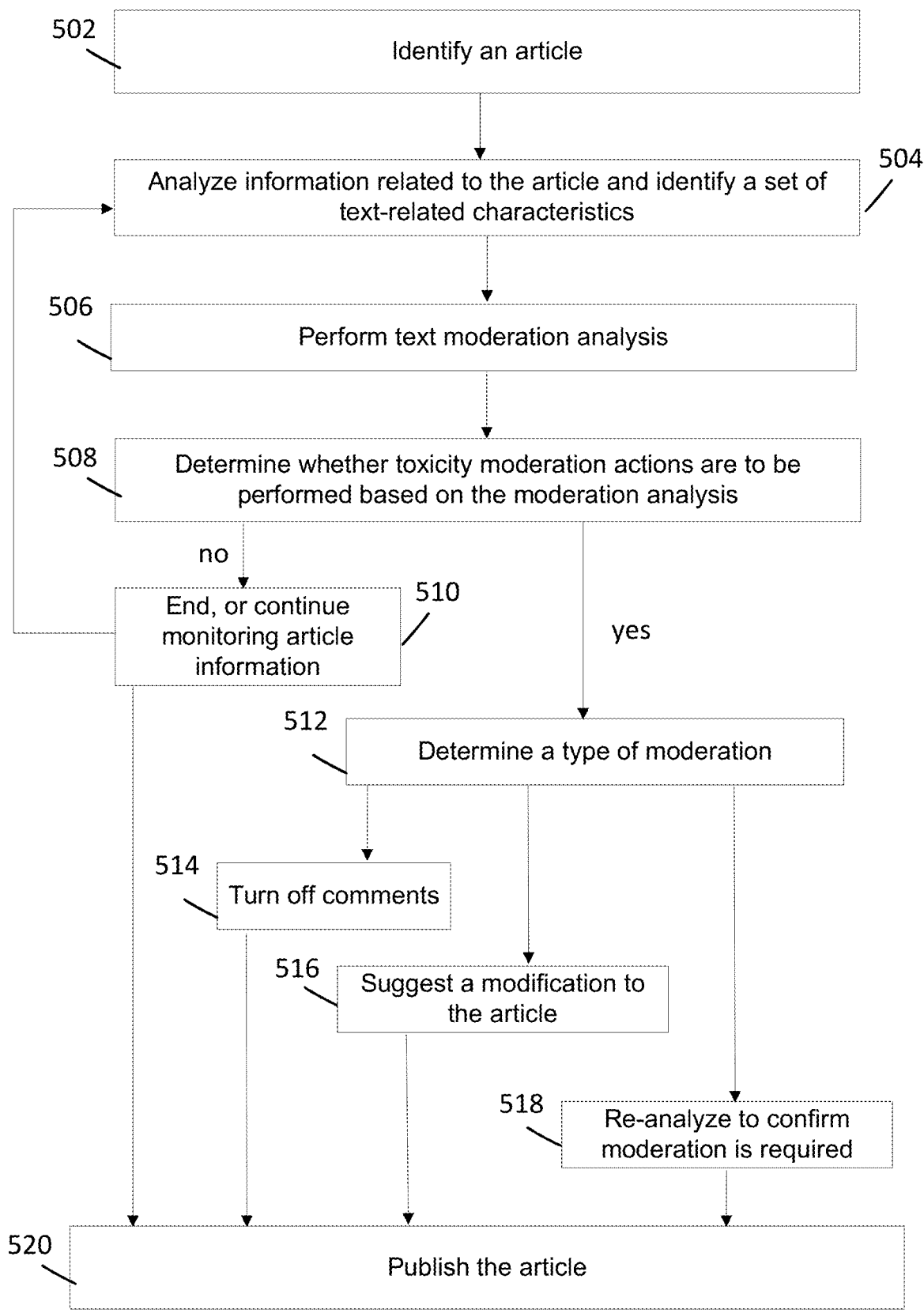

COMPUTERIZED SYSTEM AND METHOD FOR AUTOMATIC MODERATION OF ONLINE CONTENT

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates to proactive text moderation of online content prior to its publication with the intent of promoting a healthy and safe online community.

BACKGROUND

Current moderation frameworks deployed in online environments, such as web portals and other environments that enable user consumption of articles (e.g., news or user-generated content (UGC), for example), are entirely reactive based. That is, existing frameworks detect toxicity levels related to online content after publication and after the content is actively receiving user comments.

SUMMARY

The present disclosure provides a novel framework that proactively predicts a toxic propensity for online content. That is, prior to online content (e.g., an article) being posted (or, in some embodiments, prior to it receiving comments from viewing users), the disclosed framework can analyze the information related to the content (e.g., the text of the article, for example), and determine a "toxic propensity" (or "toxicity", used interchangeably) of the content's context and/or specific words, sentences, sentiments, tone or other messages receivable from consumption of the content.

Text moderation for online content enables the control of online content for the promotion of healthy interaction among users. The disclosed framework provides a novel approach through proactive forecasting of the content's toxicity. The framework determines and leverages "toxic propensity", which quantifies how likely the content (e.g., article or text of an article) is prone to incur or attract toxic comments.

According to some embodiments, for example, the framework can provide a proactive outlook index for news articles prior to their publication, which fundamentally differs from existing reactive approaches to comments, as mentioned above. As discussed below, the framework can function and/or be configured to operate in a manner that can forecast, predict and/or perceive content-level collective toxicity risk elements/factors of potential user comments, from which moderation actions related to the content can be performed prior to the content's publication in an effort to thwart, prevent or stop entirely toxic environments surrounding or stemming from the content from coming into existence.

By way of a non-limiting example, upon an author user completing the drafting of an article, and prior to its submission to a hosting server for publication, the disclosed framework can analyze the article and determine its toxic propensity. For example, the text of the article (e.g. article information) can be analyzed and a determination of the sentiment or the context of the relayed message in the article and/or portions of the article can be performed. This determination can lead to a determination of the article's toxic propensity, where the details of such toxic propensity are discussed in more detail below (at least in relation to FIGS. 4-5).

In some embodiments, continuing with the above example, the framework can automatically or suggest the functionality of turning off comments for the article upon its publication. In some embodiments, the framework may suggest modifications to the article to the author user and/or editor prior to its publication. Such suggestions, in some embodiments, can provide an indication as to the reasoning for the suggestion and/or suggested alterations to the content which may trigger alternative sentiments from the message (e.g., provide alternative wording or a suggested rephrasing of controversial words to mitigate projected odds of attracting toxic comments, for example).

In some embodiments, such moderations can be based on the toxicity determination of the article. For example, if the article is determined to be a factual relay of current events (e.g., low level of toxicity or below a threshold toxicity level), then comments may be turned off, as there may not be a need for users to comment and/or potentially stir-up conspiracies about the true current events. In another example, the comments may be enabled for such a "truth-based" article so that additional information can be provided by commenters so that the story can be further developed (e.g., a weather emergency, and commenters can provide updates related to their respective locations, for example).

For purposes of this disclosure, the online content subject to text moderation and modification and/or control, as discussed herein, will be referenced as an article posted on a web page, which includes at least the text content in the article and text content of the comments to the article. It should not be construed as limiting, however, as it should be readily understood that any other type of content depicted on a web page or online hosted document can be moderated, modified and/or controlled in a similar manner as discussed herein. For example, such other content can be, but is not limited to, images, video, multimedia messages, and the like, or some combination thereof. Moreover, any other type of readable network document, such as, for example, a social media post, chat room, or any other type of portal structure that enables viewing of content and interaction with other users view posted messages or comments can be controlled and moderated according to the disclosed systems and methods.

In accordance with one or more embodiments, the present disclosure provides computerized methods for a novel framework that moderates how online content is published on a network and controls mechanisms for interacting with the published content.

In accordance with one or more embodiments, the present disclosure provides a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., application server, messaging server, ad server, content server and/or client device, and the like) cause at least one processor to perform a method for a novel and improved framework that moderates how online content is published on a network and controls mechanisms for interacting with the published content.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 4 is a block diagram illustrating an exemplary data flow for configuring the text moderation engine 300 of FIG. 3 according to some embodiments of the present disclosure; and FIG. 5 is a block diagram illustrating an exemplary data flow for performing text moderation of online content in accordance with some embodiments of the present disclosure.

DESCRIPTION OF EMBODIMENTS

Figure 1:
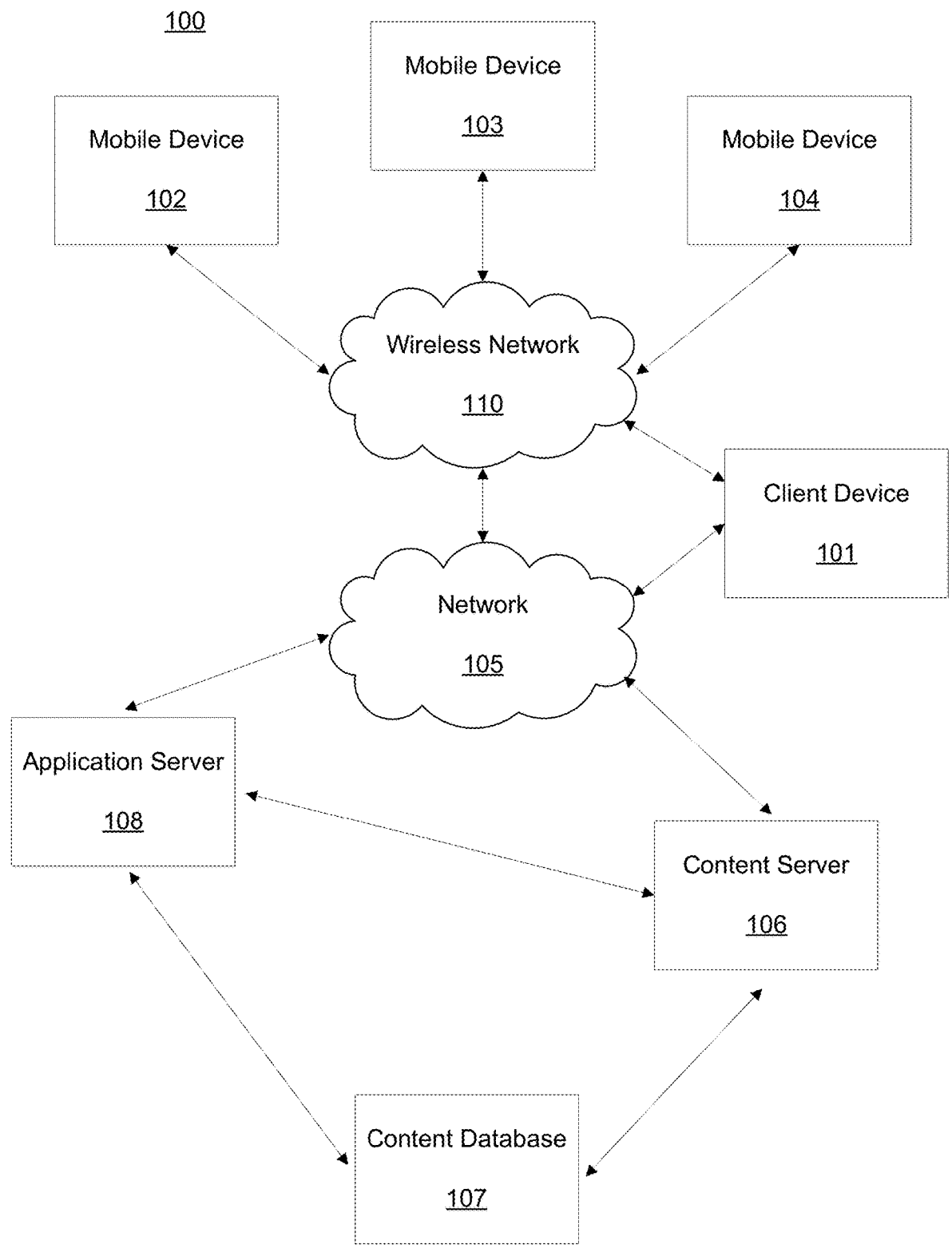
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ different architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106 and application (or "App") server 108.

One embodiment of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, searching for, viewing and/or sharing articles, memes, photographs, digital images, audio clips, video clips, social media posts or pages, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

The content server 106 may include a device that includes a configuration to provide any type or form of content via a network to another device. Devices that may operate as content server 106 include personal computers, desktop computers, multiprocessor systems, microprocessor-based or programmable consumer electronics, network PCs, servers, and the like. Content server 106 can further provide a variety of services that include, but are not limited to, email services, instant messaging (IM) services, streaming and/or downloading media services, advertising services, search services, photo services, web services, social networking services, news services, third-party services, audio services, video services, SMS services, MMS services, FTP services, voice over IP (VOIP) services, or the like.

In some embodiments, users are able to access services provided by servers 106 and 108. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, applications, such as, but not limited to, mail applications (e.g., Yahoo! Mail®, Gmail®, and the like), instant messaging applications, blog, photo or social networking applications (e.g., Facebook®, Twitter®, Instagram®, and the like), search applications (e.g., Yahoo!® Search), news applications (e.g., Yahoo! Sports®, ESPN®, Huffington Post®, CNN®, and the like), and the like, can be hosted by the application server 108, or content server 106 and the like.

Thus, the application server 108, for example, can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below (e.g. database 320 of FIG. 3). Embodiments exist where the network 105 is also coupled with/connected to a Trusted Search Server (TSS) which can be utilized to render content in accordance with the embodiments discussed herein. Embodiments exist where the TSS functionality can be embodied within servers 106 and/or 108.

Moreover, although FIG. 1 illustrates servers 106 and 108 as single computing devices, respectively, the disclosure is not so limited. For example, one or more functions of servers 106 and/or 108 may be distributed across one or more distinct computing devices. Moreover, in one embodiment, servers 106 and/or 108 may be integrated into a single computing device, without departing from the scope of the present disclosure.

Figure 2:
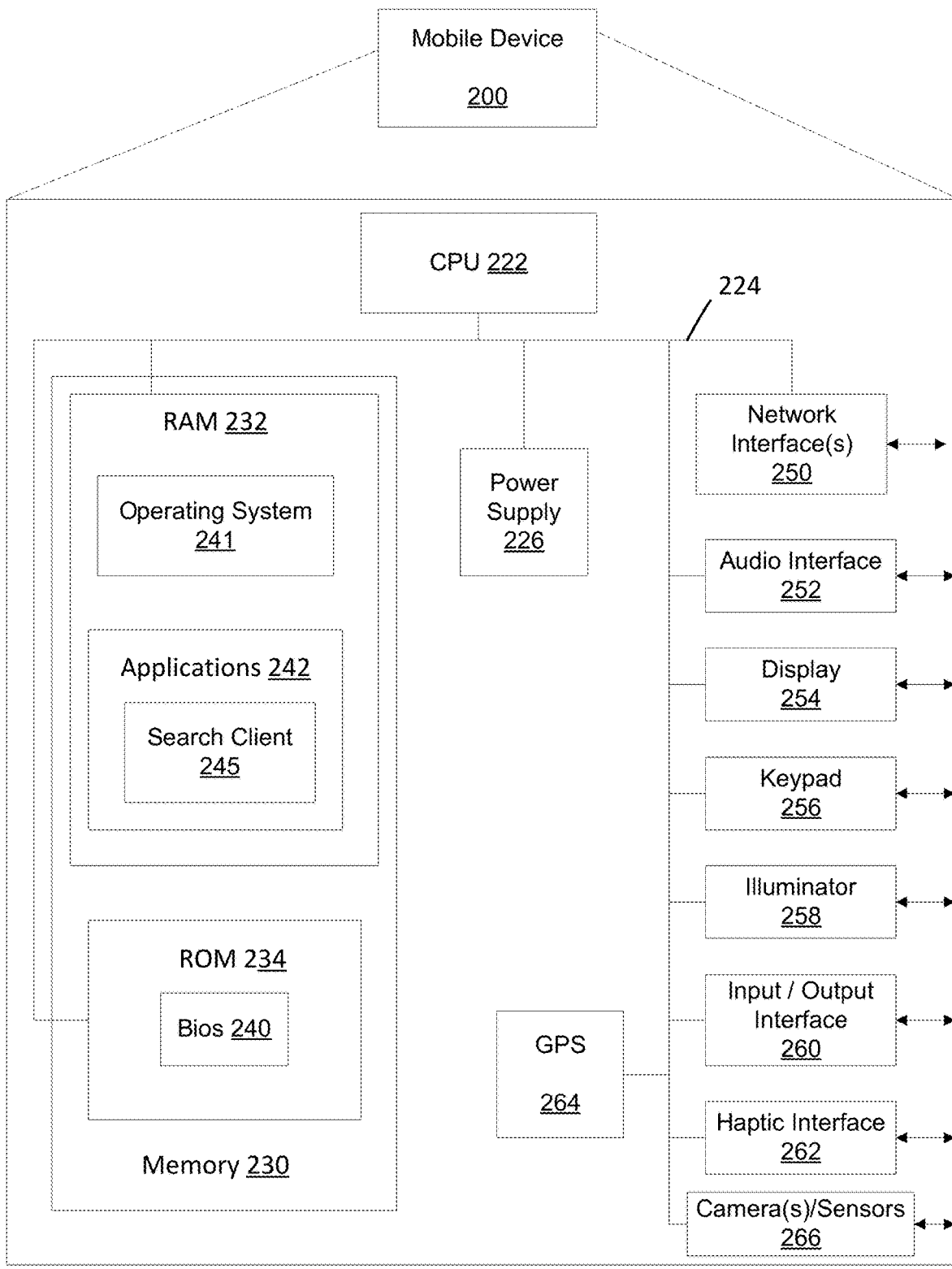
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 can be arranged to produce and receive audio signals such as, for example, the sound of a human voice. Display 254 can, but is not limited to, a include a touch sensitive screen arranged to receive input from an object such as a stylus or a digit from a human hand. Keypad 256 can comprise any input device arranged to receive input from a user. Illuminator 258 may provide a status indication and/or provide light.

Client device 200 also comprises input/output interface 260 for communicating with external devices. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth. In some embodiments however, Client device 200 may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 stores a basic input/output system ("BIOS") 240 for controlling low-level operation of Client device 200. The mass memory also stores an operating system 241 for controlling the operation of Client device 200

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below.

Figure 3:
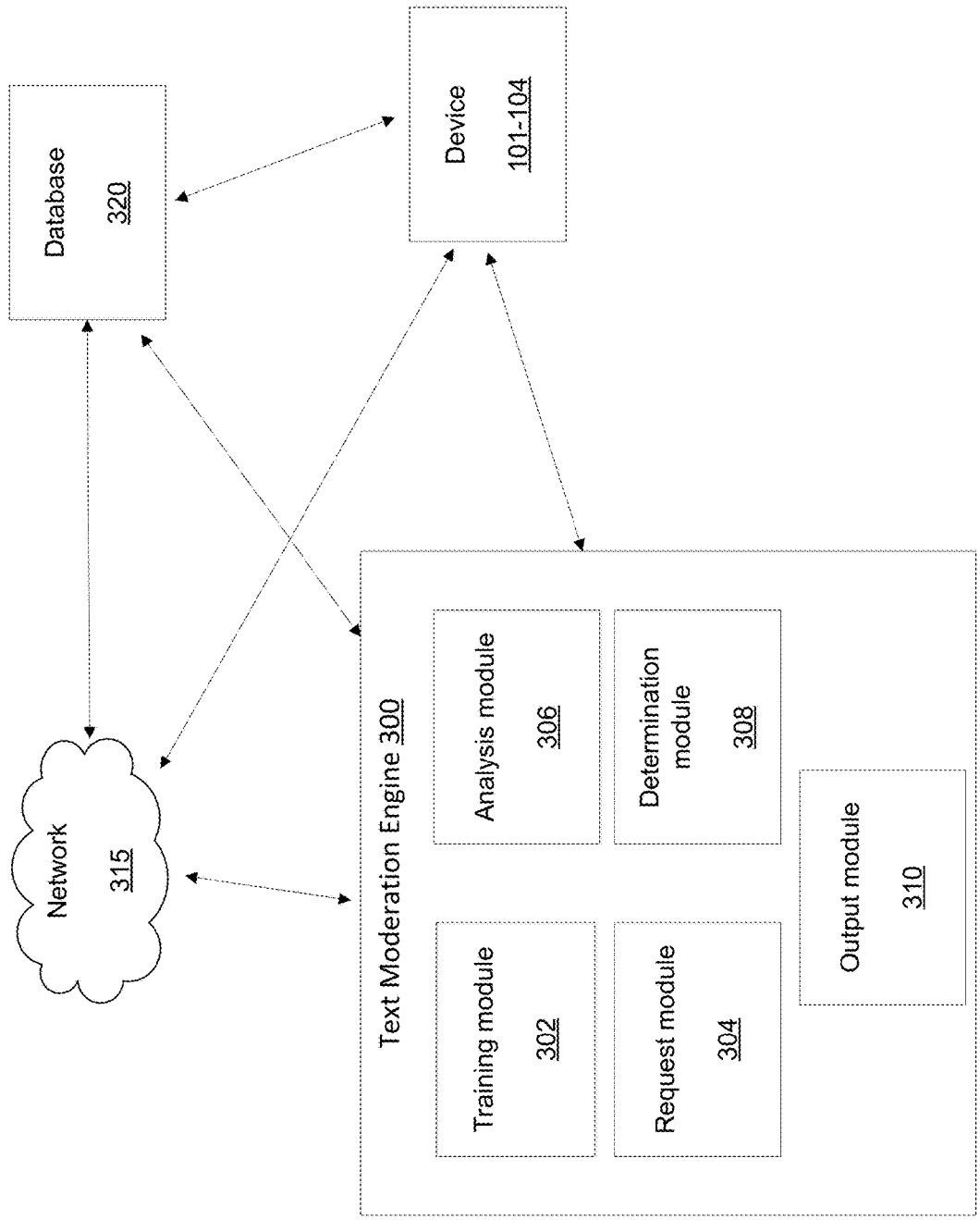
FIG. 3 is a block diagram illustrating components of an exemplary system in accordance with embodiments of the present disclosure.

FIG. 3 is a block diagram illustrating the components for performing the systems and methods discussed herein. FIG. 3 includes text moderation engine 300, network 315 and database 320. The text moderation engine 300 can be a special purpose machine or processor and could be hosted by a network server (e.g., cloud web services server(s)), application server, content server, social networking server, web server, messaging server, search server, content provider, third party server, user's computing device, and the like, or any combination thereof.

According to some embodiments, text moderation engine 300 can be embodied as a stand-alone application that executes on a networking server. In some embodiments, the text moderation engine 300 can function as an application installed on the user's device (e.g., device 101-104), and in some embodiments, such application can be a web-based application accessed by the user device over a network (e.g., network 315). In some embodiments, the text moderation engine 300 can be configured and/or installed as an augmenting script, program or application (e.g., a plug-in or extension) to another application or portal data structure.

The database 320 can be any type of database or memory, and can be associated with a content server on a network (e.g., content server, a search server or application server) or a user's device (e.g., device 101-104 or device 200 from FIGS. 1-2). Database 320 comprises a dataset of data and metadata associated with local and/or network information related to users, services, applications, content and the like.

In some embodiments, such information can be stored and indexed in the database 320 independently and/or as a linked or associated dataset. An example of this is look-up table (LUT). As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user patterns, user attributes, user preferences or settings, user demographic information, user location information, user biographic information, and the like, or some combination thereof.

In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with users, viewed articles, entered/provided comments, social media posts, messages, searches, actions, clicks, conversions, recommendations, images, videos, text, products, items and services from an assortment of media, applications and/or service providers and/or platforms, and the like. Accordingly, any other type of known or to be known attribute or feature associated with a user, an article and the content (e.g., text and images, for example, included therein), article comments, message, data item, media item, login, logout, website, application, a user and/or content included therein, or some combination thereof, can be saved as part of the data/metadata in datastore 320.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the text moderation engine 300, and the database of stored resources 320. Indeed, as illustrated in FIG. 3, the text moderation engine 300 and database 320 can be directly connected by any known or to be known method of connecting and/or enabling communication between such devices and resources.

The principal processor, server, or combination of devices that comprise hardware programmed in accordance with the special purpose functions herein is referred to for convenience as text moderation engine 300, and includes training module 302, request module 304, analysis module 306, determination module 308, output module 310 and output module 310. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Turning to FIG. 4, Process 400 is disclosed which details non-limiting example embodiments of the disclosed systems and methods. According to some embodiments, Process 400 provides non-limiting embodiments for training engine 300 pursuant to engine 300 being capable of accurately and efficiently performing a probabilistic approach based on Beta distribution to regress article toxic propensity based on the article's text.

As discussed herein, according to some embodiments, Process 400 involves identifying a set of previously published news articles with comments, and determining and averaging their toxic propensity scores as a basis for engine 300's training/learning. According to some embodiments, as discussed below, a toxic propensity score y can follow a Beta distribution with a probability density as follows:

$$p(y|\alpha, \beta) = \text{Beta}\ (\alpha, \beta) = \frac{y^{\alpha-1}(1-y)^{\beta-1}}{B(\alpha, \beta)},\quad\text{(Eq. 1)}$$

where $\alpha$ and $\beta$ can be two positive parameters to control a distribution. $B(\alpha, \beta)$ can be a normalized constant and support y meeting $y \in [0,1]$.

Therefore, as discussed herein, according to some embodiments, Process 400 provides mechanisms for training the text moderation engine 300 (which can then be used, as discussed below in relation to Process 500 of FIG. 5).

According to some embodiments, Steps 402-410 of Process 400 can be performed by training module 302 of text moderation engine 300.

As mentioned above, the discussion herein (at least in relation to FIGS. 4-5) will be directed to text content of news articles and their comments; however, it should not be construed as limiting, as any type of category of consumable online content can form the basis for training engine 300 (as discussed in relation to FIG. 4) and can be subject to its application (as discussed in relation to FIG. 5 below).

Process 400 begins with Step 402 where a set of published articles are identified (e.g., a training set of articles). In some embodiments, the articles may have been published within a predetermined period of time (e.g., within 30 days of the execution of Step 402). In some embodiments, the articles, or at least a portion of them, may be identified from the same or different domains or network locations. In some embodiments, the articles, or at least a portion of them, may be related to the same or different types of categories of content (e.g., news, social, finance, business, and the like).

In some embodiments, the set of published articles can correspond to a split or designation of particular categories of usage for training, at particular ratios. For example, articles identified in Step 402 can be split into training, validation and testing categories, which can be based on a publication date (or other criteria, such as, for example, the publisher), and can be at a ratio of 8:1:1, for example.

In some embodiments, the data identified in Step 402 for each article can be in any form that represents, relates to or corresponds to the text and/or other content of the articles and their comments (e.g., text of the comments of the article, for example). For example, Step 402 can involve engine 300 retrieving, determining or otherwise identifying raw text data for each article, which can be in the form of feature vectors and accompanying labelling information. The text data can correspond to comments related to a respective article and/or text within (or constituting) a respective article. Thus, for example, Step 402 can involve identifying a training set D of raw text feature vector data $\{(x_n, y_n)\}_{n=1}^{N}$, where $x_n$ is a feature vector, and $y_n$ a label for article n.

In Step 404, a set of text features for each article can be identified. In some embodiments, Step 404 can involve identifying the raw data text features identified from the vector data discussed above. In some embodiments, Step 404 can involve translating the text data identified in Step 402 into a feature vector for each article, and extracting or otherwise identifying the text features for each article therefrom. According to some embodiments, such translation can be performed using any type of known or to be known algorithm, technique or mechanism, such as, but not limited to, feature vector modelling, pattern recognition and machine learning (ML), and the like.

In Step 406, engine 300 performs a Beta regression on the identified set of text features. According to some embodiments, engine 300 can apply a text embedding $g(\cdot)$, and then perform the regression of $\alpha_n$ (>0) and $\beta_n$ (>0) on $g(x_n)$, respectively, as follows:

$$\log(\alpha_n) = f_\alpha(g(x_n)),$$

$$\log(\beta_n) = f_\beta(g(x_n)), \quad \text{(Eq. 2)},$$

where $f_\alpha(\cdot)$ and $f_\beta(\cdot)$ can be jointly learned, and $g(\cdot)$ can be either pre-fixed or a learned embedding with $f_\alpha(\cdot)$ and $f_\beta(\cdot)$. For example, $g(\cdot)$ can be based on a bag of words (BOW) or Bidirectional Encoder Representations from Transformers (BERT) embedding, where BOW and/or BERT can be based on a selection of particular terms/embeddings resultant from a Term Frequency Inverse Document Frequency (TF-IDF) vector analysis of each article. In some embodiments, BERT is utilized rather than BOW. In some embodiments, the selection of particular terms/embeddings can occur and can be performed based on the length of text being analyzed surpassing a threshold length limit, and truncation of the text totality may be required so as to focus on particular portions of the text (e.g., the beginning or end, as they typically provide the most informative snippets of information).

In some embodiments, $f_\alpha(\cdot)$ and $f_\beta(\cdot)$, and in some embodiments, $g(\cdot)$, can be learned to minimize loss:

$$\mathcal{L} = -\frac{1}{N}\sum_{n=1}^{N} \log(p(y_n|\alpha_n, \beta_n)). \quad \text{(Eq. 3)}$$

According to some embodiments, Step 406 therefore can involve performing the regression of Eqs. 1 and 2 on each article n, while minimizing loss via Eq. 3 to predict and learn each article's toxicity, and thereby understand the words and combination of words that trigger particular types and levels of toxicity.

In some embodiments, the mean of Eq. 1 can be used as an toxicity estimator:

$$\widehat{y_m} = \frac{\alpha_m}{\alpha_m + \beta_m}, \quad \text{(Eq. 4)}$$

which can be a viable option in some embodiments because an average toxicity for an article (and its comments) is being computed rather than a specific toxicity for each article and/or each comment or set of comments.

Process 400 proceeds from Step 406 to Step 408, where a ML classifier can be applied to the Beta regression performed in Step 406. As discussed above, a toxic propensity determination (e.g., average scoring) for an article in the training set of articles can be determined (Step 406). Engine 300, in Step 408, can then execute a ML classifier to analyze the Beta regression analysis. In some embodiments, the ML classifier applied can be any type of artificial intelligence (AI) or ML regression algorithm, such as, but not limited to, neural network, computer vision, and the like.

Thus, as a result of Step 408's BERT-Beta (or BERT-β) regression ML classification, engine 300 can be trained to identify which words and/or combination of words correspond to toxic or harmful speech (e.g., their toxic propensity). Thus, in some embodiments, engine 300 can be trained to learn which words cause some text (in a comment and/or article) to be toxic. This information can be stored for usage of engine 300, as discussed below in relation to FIG. 5, below. For example, profanity within a comment can be identified or classified as promoting a toxic level of engagement. In another example, obvious mistruths (e.g., the world is flat) may fall within the same spectrum.

Process 400 concludes with Step 410 where the BERT-β regression ML classifier (also referred to as Beta regression ML classifier, used interchangeably) can be compiled and prepared for application to pre-published articles. Such compilation is based on the learned trained from Steps 406-408, as discussed above, which enables engine 300 to execute the Beta regression ML classifier to understand the toxicity of words in an article and enable moderation of the text prior to its publication, as discussed below.

Turning to FIG. 5, Process 500 provides mechanisms for performing the disclosed text moderation on pre-published articles via the trained text moderation engine 300.

According to some embodiments, engine 300 can execute the steps of Process 500 for any type of article (or electronic document), whether currently being drafted or completed, and from any source (e.g., a third party requesting to publish an article on another platform, for example). In some embodiments, when the article is currently being drafted, the processing of the below steps of Process 500 can be periodically triggered and executed, and can be based on predetermined timing, predetermined a word limit being satisfied, types of words being identified/detected (e.g., via natural language processing (NLP) or BERT analysis, as discussed above) as they are entered, and the like, or some combination thereof.

For the purposes of this discussion, a completed article (e.g., an article where the author is done writing and it is either being requested for submission for publication or awaiting an editor's review, for example) will be used as the basis for Process 500's processing; however, as mentioned above, it should not be construed as limiting, as any stage of an article can be analyzed via the functionality discussed herein.

According to some embodiments, Step 502 of Process 500 can be performed by request module 304 of text moderation engine 300; Steps 504-506 can be performed by analysis module 306; Steps 508-512 can be performed by determination module 308; and Steps 514-520 can be performed by output module 310.

Process 500 begins with Step 502 where an article is identified. As mentioned above, the article is being requested for publication to a particular network location (e.g., a web site or domain).

In Step 504, the information related to the article (referred to herein as article information) is analyzed, and a set of text related characteristics are identified. According to some embodiments, the article information can include the text of the article. In some embodiments, the article information can also include, but is not limited to, vector data of the article and its text (e.g., a feature vector for the article), author identity, source identity, destination identity, topic, types of words, word count, paragraph count, sentence count, other content included (e.g., images depicted along with the text), and the like, or some combination thereof.

In Step 506, engine 300 performs text moderation analysis on the article information by applying the learned Beta regression ML classifier to the text of the article. In a similar manner as discussed above in relation to Process 400, engine 300's application of the Beta regression ML classifier enables the determination of a toxicity (e.g., a scoring) of particular word or words in the article. In some embodiments, a word's toxic propensity can be determined, and in some embodiments, each word's relation to other words in the article (e.g., a combination of words) can lead to a toxic propensity determination.

In some embodiments, Step 506 can result in a toxicity scoring for at least one of each word in the article, a set of word combinations in the article (e.g., sentences), and an average score for each word or word combination.

In Step 508, engine 300 determines whether toxicity moderation actions are required or needed to be performed based on the analysis of Step 506. That is, in some embodiments, Step 508 enables engine 300 to determine whether particular actions respective to the article and its text are required because, for example, certain words or combinations of words have been identified as particularly prone to incur or attract toxic comments.

In some embodiments, Step 508 can involve a determination if the toxic propensity scoring from Step 506 is at or below a threshold toxicity level. If so, Process 500 can proceed to Step 510, where the analysis of the article can be concluded and the article can be submitted for publishing, as in Step 520.

In some embodiments, Step 510 can involve further monitoring of the article for embodiments where the article is currently being drafted and the processing of Process 500 is being applied as the author user continues the drafting of the article, as discussed above. Here, Process 500 could then proceed back to Step 504 for further analysis of the updated article as modifications to the article are performed (e.g., addition of text and/or changes or deletions of previously existing text).

When Step 508 determines that actions are required on the article (e.g., at least a portion of the words in the article have a toxic propensity above the toxicity threshold, or an average of the terms in the article surpass the toxicity threshold), Process 500 proceeds to Step 512 where a determination is made regarding a type(s) of moderation that is required.

In some embodiments, the types of moderations can include, but are not limited to, turning off the comments (as in Step 514), suggesting a modification to the article (as in Step 516) and/or re-analyzing the article and/or a specific word or words to confirm that moderation is required (as in Step 516). In some embodiments, the type of moderation can be selected or determined based on a value of a toxic propensity scoring (from Step 508—for example, the scoring is at a level above the toxicity threshold that the comments should be turned off since the probability that the article will incite toxic comments is extremely high).

In some embodiments, Step 514 can involve augmenting or tagging the article with instructions that cause its publication in Step 520 to prevent comments from being received on the page where the article is being displayed (e.g., disable or turn-off comment functionality on the page where the article is being published).

In some embodiments, Step 516 can involve sending a message or notification to a revising user (e.g., the author user, or another user (e.g., an editor)) and requesting modification of the article as a particular word or words were identified as being probable for creating a toxic environment/comment(s) (e.g., words in the article that caused the toxic propensity scoring to be above the toxicity threshold). In some embodiments, Step 516 can involve engine 300 searching a language dictionary for related or synonymous terms to recommend to the revising user. In some embodiments, engine 300 can provide a notification to the revising user that indicates the toxicity detected (e.g., the determined score(s)) and which words are causing such toxicity.

In some embodiments, should modifications be made, the article can be reanalyzed, in a similar manner as discussed above in relation to Step 510. In some embodiments, should the modifications correspond to suggested modifications, then the article can be published, as in Step 520. In some embodiments, a modified article, as in Step 516, can also be subject to Step 514 where its comments may be turned off. In some embodiments, this may occur when modifications are not made, or alternative modifications are made that remain above the toxicity threshold.

In some embodiments, prior to publication, Step 518 can be performed for any and all articles. In some embodiments, upon performing Steps 514 and 516, Process 500 can also perform Step 518. In some embodiments, Step 518 can be performed in a similar manner as discussed above in relation to Step 510, and in some embodiments, Step 518 can be performed by a revising user (e.g., editor). At the conclusion of Step 518, the article can be submitted for publishing, as in Step 520.

According to some embodiments, information resultant from performance of the steps of Process 500 (e.g., at least Steps 502-518) can be compiled and fed back to engine 300 for further training and refinement. Such training can be performed in a similar manner as discussed above in relation to Process 400 of FIG. 4.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
    training, by a device, using training data, a regression classifier to determine a toxic propensity score based on input;
    identifying, by the device, an article, the article comprising a plurality of words comprised of text;
    analyzing, by the device, the article, and identifying, as the input to the regression classifier, article information related to the plurality of word;
    executing, by the device, the regression classifier on the article information as the input to the regression classifier, execution of the regression classifier on the article information determining, for the article, a toxic propensity score indicating how likely the article is to attract toxic comments;
    determining, by the device, a type of moderation to perform on the article based on the determined toxic propensity score indicating that the article is likely to attract toxic comments; and
    moderating, by the device, the article based on the type of determined moderation, the moderation comprising providing instructions for the article comprising the plurality of words comprised of text to be published with commenting disabled.

2. The method of claim 1, further comprising:
    publishing the moderated article at a network location with commenting disabled.

3. The method of claim 1, providing instructions further comprising:
    augmenting the article with the instructions for the article to be published with commenting disabled.

4. The method of claim 1, further comprising:
    identifying a set of words that cause the toxic propensity score to be above a toxicity threshold; and
    providing a suggestion for a modification of the set of words, wherein the modifications to the portion of text correspond to the suggestion.

5. The method of claim 4, further comprising:
    identifying an alternative set of words as an alternative to the identified set of words, the alternative set of words enabling lowering of the toxic propensity score; and
    providing the alternative set of words within the suggestion.

6. The method of claim 4, further comprising:
    executing, by the device, the regression classifier on a revised article responsive to the provided suggestion, and determining, for the revised article, a new toxic propensity score indicating how likely the revised article is to attract toxic comments;
    determining that the new toxic propensity score is below a toxicity threshold; and
    publishing the revised article at a network location without disabling commenting in connection with publication of the article.

7. The method of claim 1, wherein training a regression classifier further comprising:
    identifying, by the device, a set of training articles;
    analyzing, by the device, each training article, and identifying a set of text features;
    performing a Beta regression analysis on the set of text features;
    executing a machine learning (ML) classifier based on the Beta regression analysis; and
    compiling a Beta regression ML classifier based on the execution of the ML classifier.

8. The method of claim 7, wherein the regression classifier executed on the article information is the compiled Beta regression ML classifier.

9. The method of claim 7, wherein the text features correspond to feature vectors for each article, wherein identification of the set of training articles further comprises identifying each training article's feature vector.

10. The method of claim 1, further comprising:
    determining a plurality of toxic propensity scores in relation to the plurality of words; and
    determining an average toxic propensity score, wherein the determined toxic propensity score for the article is based on the average toxic propensity score.

11. The method of claim 10, wherein each of the plurality of toxic propensity scores corresponds to an individual word in the article.

12. The method of claim 10, wherein each of the plurality of toxic propensity scores corresponds to a combination of a set of words in the article.

13. The method of claim 1, further comprising:
    receiving, from a user, a request to publish the article, wherein the identification of the article is based on the request.

14. The method of claim 1, wherein the article information further comprises data selected from a group consisting of: the text, vector data of the article, author identity, source identity, destination identity, topic, types of words, word count, paragraph count, sentence count and other content in the article.

15. A non-transitory computer-readable storage medium tangibly encoded with computer-executable instructions, that when executed by a processor associated with a device, performs a method comprising:

training, by the device, using training data, a regression classifier to determine a toxic propensity score based on input;

identifying, by the device, an article, the article comprising a plurality of words comprised of text;

analyzing, by the device, the article, and identifying, as input to the regression classifier, article information related to the plurality of words;

executing, by the device, the regression classifier on the article information as the input to the regression classifier, execution of the regression classifier on the article information determining, for the article, a toxic propensity score indicating how likely the article is to attract toxic comments;

determining, by the device, a type of moderation to perform on the article based on the determined toxic propensity score indicating that the article is likely to attract toxic comments;

moderating, by the device, the article based on the type of determined moderation, the moderation comprising providing instructions for the article comprising the plurality of words comprised of text to be published with commenting disabled; and publishing the moderated article at a network location.

16. The non-transitory computer-readable storage medium of claim 15, providing instructions further comprising:

augmenting the article with instructions for the article to be published with commenting disabled.

17. The non-transitory computer-readable storage medium of claim 15, further comprising:

identifying a set of words that cause the toxic propensity score to be above a toxicity threshold;

identifying an alternative set of words for the identified set of words, the alternative set of words enabling lowering of the toxic propensity score; and providing a suggestion for the modification of the set of words, the suggestion comprising information related to the alternative set of words, wherein the modifications to the portion of text correspond to the suggestion.

18. A device comprising:

a processor configured to:

train, using training data, a regression classifier to determine a toxic propensity score based on input;

identify an article, the article comprising a plurality of words comprised of text;

analyze the article, and identify, as input to the regression classifier, article information related to the plurality of words;

execute the regression classifier on the article information as the input to the regression classifier, execution of the regression classifier on the article information determining, for the article, a toxic propensity score indicating how likely the article is to attract toxic comments;

determine a type of moderation to perform on the article based on the determined toxic propensity score indicating that the article is likely to attract toxic comments;

moderate the article based on the type of determined moderation, the moderation comprising providing instructions for the article comprising the plurality of words comprised of text to be published with commenting disabled; and publish the moderated article at a network location.

19. The device of claim 18, providing instructions further comprising:

augment the article with the instructions for the article to be published with commenting disabled.

20. The device of claim 18, further comprising:

identify a set of words that cause the toxic propensity score to be above a toxicity threshold;

identify an alternative set of words for the identified set of words, the alternative set of words enabling lowering of the toxic propensity score; and provide a suggestion for a modification of the set of words, the suggestion comprising information related to the alternative set of words, wherein the modifications to the portion of text correspond to the suggestion.

* * * * *